US012735544B2

(12) United States Patent
Bai et al.

(10) Patent No.: US 12,735,544 B2
(45) Date of Patent: Sep. 15, 2026

(54) PROCESS FOR FOAMING USING CARBON DIOXIDE SOLUTION

(71) Applicant: DMN MATERIAL TECHNOLOGY (JIANGSU) LIMITED, Nanjing (CN)

(72) Inventors: Peng Bai, Nanjing (CN); Zhenxiu Zhang, Nanjing (CN)

(73) Assignee: DMN MATERIAL TECHNOLOGY (JIANGSU) LIMITED, Nanjing (CN)

( * ) Notice: Subject to any disclaimer, the term of this patent is extended or adjusted under 35 U.S.C. 154(b) by 558 days.

(21) Appl. No.: 18/228,684

(22) Filed: Aug. 1, 2023

(65) Prior Publication Data

US 2023/0374244 A1 Nov. 23, 2023

Related U.S. Application Data

(63) Continuation of application No. PCT/CN2022/079780, filed on Mar. 8, 2022.

(51) Int. Cl.

| | |
|---|---|
| ***C08J 9/18*** | (2006.01) |
| ***C08J 3/28*** | (2006.01) |
| ***C08J 9/12*** | (2006.01) |
| ***C08J 9/232*** | (2006.01) |

(52) U.S. Cl.

CPC . *C08J 9/18* (2013.01); *C08J 3/28* (2013.01); *C08J 9/122* (2013.01); *C08J 9/232* (2013.01); *C08J 2203/02* (2013.01); *C08J 2203/22* (2013.01); *C08J 2323/06* (2013.01)

(58) Field of Classification Search

CPC ....... C08J 9/18; C08J 3/28; C08J 9/122; C08J 9/232; C08J 2203/02; C08J 2203/22; C08J 2323/06; C08J 2201/026; B29C 44/3488

See application file for complete search history.

(56) References Cited

U.S. PATENT DOCUMENTS

| | | | | |
|---|---|---|---|---|
| 5,670,102 | A | 9/1997 | Perman et al. | |
| 2014/0272379 | A1* | 9/2014 | Watkins | B29D 35/122 264/417 |
| 2017/0121480 | A1 | 5/2017 | Farris et al. | |
| 2022/0274297 | A1* | 9/2022 | Chang | B29C 44/355 |

FOREIGN PATENT DOCUMENTS

| | | | | |
|---|---|---|---|---|
| CN | 103665613 A | | 3/2014 | |
| CN | 208290307 U | * | 12/2018 | |
| CN | 110846011 A | * | 2/2020 | C09K 8/518 |

* cited by examiner

*Primary Examiner* — K. Boyle

(74) *Attorney, Agent, or Firm* — Jose Cherson Weissbrot

(57) ABSTRACT

The invention relates to a foaming process using carbon dioxide solution, comprising: put a parison into the carbon dioxide solution for primary foaming, remove and put the parison into the carbon dioxide solution for secondary foaming to get the foam product. Compared with foaming process using high-pressure gas directly, the foaming process using polar liquid system can get a uniform foam structure with high foaming rate faster, and has good foaming effect for high crystalline polymers. To control the change of temperature and pressure after the introduction of carbon dioxide, the impact and penetration of carbon dioxide on the surface of the crosslinked material can be controlled first, and the solubility of carbon dioxide in the polar system can be improved by further increasing pressure and temperature, thereby promoting the formation of uniform foam structure with high foaming rate in the subsequent heat foaming process.

10 Claims, 1 Drawing Sheet

PROCESS FOR FOAMING USING CARBON DIOXIDE SOLUTION

CROSS-REFERENCE TO RELATED APPLICATIONS

The present application is a continuation of International Application No. PCT/CN2022/079780, with an international filing date of Mar. 8, 2022, which is based upon and claims priority to Chinese Patent Application No. 202110943093.1, filed on Aug. 17, 2021, the entire contents of all of which are incorporated herein by reference.

TECHNICAL FIELD

The present invention relates to foaming technologies, specifically relates to C08J9/18 and more particularly relates to a method for preparing foaming material by supercritical foaming.

BACKGROUND

As a kind of important polymer products, polymer foam materials have important uses in construction, chemical industry, medicine and daily life. As a green foaming method, carbon dioxide foaming has been widely concerned.

CN102875882A provides a polyethylene carbon dioxide extrusion micro-foaming product and a preparation method. The polyethylene carbon dioxide extrusion micro-foaming product is obtained by taking polyethylene as the base material, adding the foaming agent sodium bicarbonate, the lubricant and the nucleating agent, and then mixing, extrusion foaming, press-polishing, cooling and forming. The invention uses sodium bicarbonate to replace liquid carbon dioxide, and therefore has the advantages of simple foaming process, low production cost, no toxic substances decomposed, safety, simple formula and high yield.

However, the current foaming methods have low foaming rate, especially for products with high crystallinity, and the size of foams varies greatly, which affects the development of foam materials.

SUMMARY

To solve the above problems, the invention provides a process for foaming using carbon dioxide solution in the first aspect, including the following steps: put a parison into the carbon dioxide solution for primary foaming, remove and put the parison into the carbon dioxide solution for secondary foaming to get the foam product.

In an embodiment, the parison of the invention is obtained by radiation crosslinking of polymers or crosslinking curing of chain extenders.

In an embodiment, the crosslinking curing of the invention includes the following step: the parison is prepared by blending, curing and forming of polymers, chain extenders and catalysts.

In an embodiment, the polymer of the invention can be a crystalline polymer or non-crystalline polymer, and the crystalline polymer can be polyolefin homopolymer, polyolefin copolymer, polyester, polyimide, etc., such as polyethylene, polypropylene polytetrafluoroethylene, polyethylene terephthalate, etc.

In an embodiment, the weight ratio of polymers, chain extenders and catalysts in the invention is (80-90):(3-6):(1-2).

In an embodiment, the chain extenders of the invention may be compounds containing peroxy, vinyl or isocyanate group, preferably compounds containing peroxy such as organic peroxides, which can be listed as follows: 2,5-bis (tert-butylperoxy)-2,5-dimethylhexane, tert-Butyl peroxy-2-ethylhexanoate, tert-butyl perisononanoate, 2,5-di(tert-butylperoxy)-2,5-dimethyl-3-hexyne, tert-butyl peroxypivalate, di-t-butyl peroxide and di-tert-butyl peroxide; the chain extenders can also include allyl chain extenders, such as 1,6-hexanediol diacrylate, dipropylene glycol diacrylate, triallyl isocyanurate, tricyclodecane dimethanol dimethacrylate, etc.

The catalysts of the invention can generate free radicals or anions under the action of light or heat to promote curing and chain expansion, which can be listed as follows: benzophenone, 1-hydroxycyclohexyl phenyl ketone, 2-phenylacetophenone, 1-hydroxycyclohexyl phenyl ketone, 2,2'-azodiisobutyronitrile, 2,2'-azobisisoheptonitrile, etc., which are not limited.

The molding method can be extrusion molding, hot pressing molding, compression molding, etc., which are not limited.

In an embodiment, the carbon dioxide solution of the invention includes carbon dioxide and a solvent.

In an embodiment, the solvent of the invention includes hydroxyl inorganic substances, such as water, etc., which is not limited. The mass percentage of hydroxyl inorganic substance in the solvent is not limited in the invention. The mass percentage of hydroxyl inorganic substance in the solvent can be 0-100 wt %, excluding 0 wt %, preferably 50-100 wt %, more preferably 80-100 wt %.

In an embodiment, the solvent of the invention also includes inorganic acids such as carbonic acid.

In an embodiment, the solvent of the invention also includes alcohols, esters, ketones, heterocyclic compounds, hydrocarbons and inorganic salts, which are not limited, such as methanol, methyl ethyl ketone, ethyl formate, tetrahydrofuran, hexane, sodium chloride, etc.

When the polymers, especially high crystalline polymers, are foamed, the molecular chain is difficult to move because of its high crystalline, so that carbon dioxide is hard to infiltrate into the parison and form the foam product with high foaming ratio; to get the foam material, long-time treatment in the high temperature and high pressure carbon dioxide is required, which will cause the waste of cost and energy. The inventor finds that the polymers are immersed in the carbon dioxide solution after crosslinking curing, especially in the solution containing carbon dioxide and water, and the high foam materials can be obtained in a relatively short time. This may be because co MPared with the polymer treatment using carbon dioxide, carbon dioxide is soluble in aqueous solution to form a certain carbon dioxide, water and carbonic acid balanced solution, so that the carbon dioxide, water and carbonic acid produce and decompose acids to further promote the penetration of solution and obtain the parison with high saturation concentration in a short time.

In an embodiment, the parison is put into the pre-foaming device filled with solvent in the primary foaming process, sealed, filled with carbon dioxide, and foamed at 100-160 degrees C. and 40-50 MPa for 2-3 hours.

In an embodiment, the parison is foamed at 40-60 degrees C. and 10-15 MPa for 20-40 minutes before being foamed at 100-160 degrees C. and 40-50 MPa for 2-3 hours.

In addition, the inventor finds that high carbon dioxide concentration and reaction in the parison easily damage the structure of the carbon dioxide nucleation structure and the interface stability to generate nonuniform foams. The inventor finds that a uniform carbon dioxide nucleation is formed after foaming for a period of time at low temperature and low pressure, then the parison reacts at high temperature and high pressure, the solubility of carbon dioxide is moderately increased under the coordination of reducing the dissolution of carbon dioxide in the solvent by increasing the temperature and increasing the the dissolution of carbon dioxide at high pressure, because more carbon dioxide nucleations are provided under the action of improving the molecular chain mobility and free volume at high temperature to increase the carbon dioxide concentration in the parison and improve the foam uniformity.

In an embodiment, the secondary foaming temperature of the invention is 120-130 degrees C.

In an embodiment, the secondary foaming time of the invention is 1-2 hours.

To further improve the foaming ratio and the foam growth, the inventor performs the secondary foaming after primary foaming. The inventor finds that the control of secondary foaming at the appropriate temperature is advantageous to the formation of uniform foam structure with high foaming rate and promotes the surface gloss. This may be because the foam structure obtained by primary foaming at the appropriate temperature and the aqueous solution containing carbon dioxide and carbonic acid between the polymer chains generate water evaporation and endothermic reaction from carbonic acid decomposition under the action of heat. If the temperature is low, the internal temperature transfer of the parison will be affected to influence the foam size and uniformity in the parison. If the secondary foaming temperature is too high, large holes and other problems may be caused by the movement of polymer chain, so that shrinkage and other problems occur in the cooling process after heat foaming, affecting the surface smoothness and gloss.

Compared with the prior art, the invention has the following beneficial effects:

(1) Compared with the process for foaming using the polar liquid system, the process for foaming using high-pressure gas can get a uniform foam structure with high foaming rate faster, and has good foaming effect even for high crystalline polymers.

(2) To control the change of temperature and pressure after the introduction of carbon dioxide, the impact and penetration of carbon dioxide on the surface of the crosslinked material can be controlled first, and the solubility of carbon dioxide in the polar system can be improved by further increasing pressure and temperature to accelerate the saturation of carbon dioxide in the polymer, thereby promoting the formation of uniform foam structure with high foaming rate in the subsequent heat foaming process.

(3) Control of the heat foaming temperature and time can promote the formation and expansion of the foams, so that the surface is glossy.

DETAILED DESCRIPTION OF THE PREFERRED EMBODIMENTS

Figure 1:
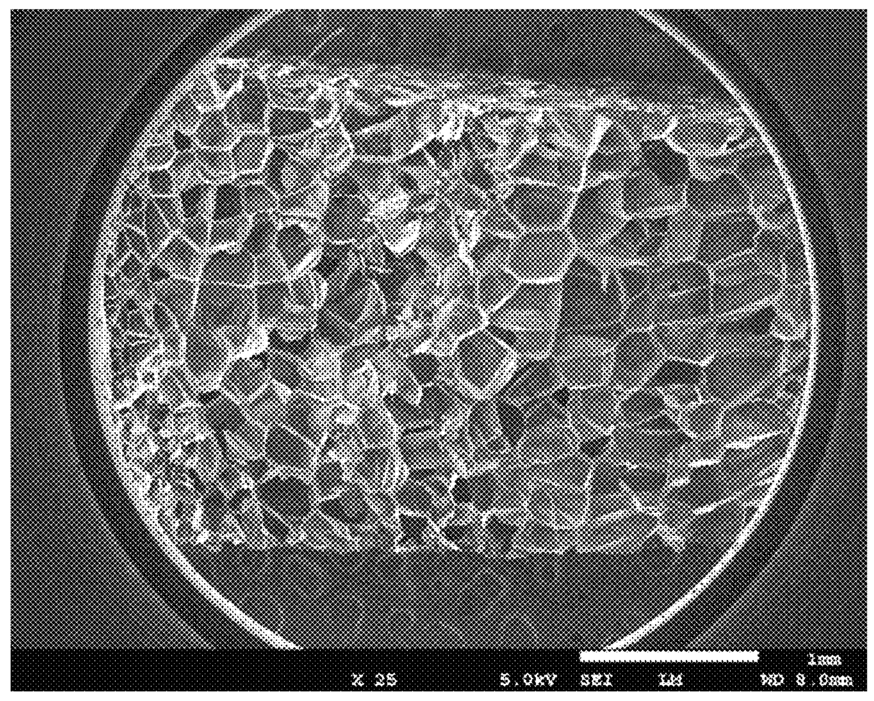
FIG. 1 is the SEM image of the example 1.

The term "and/or" used herein includes any and all combination of one or more related enumerated items. When the statement such as "at least one of . . . " is before after a list of elements, it modifies the entire list of elements rather than the individual element of the list.

The terms used herein are intended only to describe specific embodiments and are not intended to limit the concept of the invention. The singular forms "a/an" and "the" include the plural referents, unless the context otherwise specifies clearly. It will be understood in the paragraphs below that the terms such as "include", "have" and "contain" are intended to denote the existence of features, numbers, steps, actions, components, parts, and/or combinations thereof disclosed in the specification, and are not intended to exclude the possibility of the existence or addition of one or more additional features, numbers, steps, actions, components, parts, and/or combinations thereof. The term "or" means "and/or". The expression "I" can be interpreted as "and" or "or".

Unless otherwise defined, all terms used herein (including technical and scientific terms) have the same meaning as those normally understood by ordinary technicians in the field of the general invention concept. It is further understood that terms, such as those defined in commonly used dictionaries, shall be interpreted to mean the same as they mean in the summary of the invention and the context of related fields, and shall not be interpreted in an idealized or overly formal sense, except as clearly defined herein.

Example 1

The example provides a process for foaming using carbon dioxide solution, which include the following steps: put a parison into the carbon dioxide solution for primary foaming, remove and put the parison into the carbon dioxide solution for secondary foaming to get the foam product. The primary foaming includes the following steps: put the parison into the pre-foaming device filled with water, seal, inject carbon dioxide, foam at 50 degrees C. and 12 MPa for 30 minutes, and then foam at 140 degrees C. and 45 MPa for 2.5 hours. The secondary foaming temperature is 125 degrees C., and the secondary foaming time is 1.5 hours. The parison is prepared by blending the polymer, the chain extender and the catalyst, and the weight ratio of polymers, chain extender and catalyst is 85:4:1.5, the polymer is HDPE, which is DowDuPont DMDA-6200, the chain extender is 2,5-di(tert-butylperoxy)-2,5-dimethyl-3-hexyne, and the catalyst is 2,2'-azodiisobutyronitrile.

Example 2

The example provides a process for foaming using carbon dioxide solution, which include the following steps: put a parison into the carbon dioxide solution for primary foaming, remove and put the parison into the carbon dioxide solution for secondary foaming to get the foam product. The primary foaming includes the following steps: put the parison into the pre-foaming device filled with water, seal, inject carbon dioxide, foam at 60 degrees C. and 15 MPa for 20 minutes, and then foam at 160 degrees C. and 50 MPa for 2 hours. The secondary foaming temperature is 130° C., and the secondary foaming time is 1 $h_{\circ}$ The parison is prepared by blending the polymer, the chain extender and the catalyst, and the weight ratio of polymers, chain extender and catalyst is 90:6:2, the polymer is HDPE, which is 8010 plastic, the chain extender is tert-Butyl peroxy-2-ethylhexanoate, and the catalyst is 2,2'-azobisisoheptonitrile.

Example 3

The example provides a process for foaming using carbon dioxide solution, which include the following steps: put a parison into the carbon dioxide solution for primary foaming, remove and put the parison into the carbon dioxide solution for secondary foaming to get the foam product. The primary foaming includes the following steps: put the parison into the pre-foaming device filled with water, seal, inject carbon dioxide, foam at 40 degrees C. and 10 MPa for 40 minutes, and then foam at 130 degrees C. and 40 MPa for 3 hours. The secondary foaming temperature is 120° C., and the secondary foaming time is 2 h。The parison is prepared by blending the polymer, the chain extender and the catalyst, and the weight ratio of polymers, chain extender and catalyst is 80:3:1, the polymer is HDPE, which is DowDuPont DMDA-6200, the chain extender is tert-butyl peroxypivalate, and the catalyst is 2,2'-azodiisobutyronitrile.

Example 4

The example provides a process for foaming using carbon dioxide solution, which include the following steps: put a parison into the carbon dioxide solution for primary foaming, remove and put the parison into the carbon dioxide solution for secondary foaming to get the foam product. The primary foaming includes the following steps: put the parison into the pre-foaming device filled with water, seal, inject carbon dioxide, and foam at 140 degrees C. and 45 MPa for 3 hours. The secondary foaming temperature is 125° C., and the secondary foaming time is 1.5 h。The parison is prepared by blending the polymer, the chain extender and the catalyst, and the weight ratio of polymers, chain extender and catalyst is 85:4:1.5, the polymer is HDPE, which is DowDuPont DMDA-6200, the chain extender is 2,5-bis(tert-butylperoxy)-2,5-dimethylhexane, and the catalyst is 2,2'-azodiisobutyronitrile.

Example 5

The example provides a process for foaming using carbon dioxide solution, which include the following steps: put a parison into the carbon dioxide solution for primary foaming, remove and put the parison into the carbon dioxide solution for secondary foaming to get the foam product. The primary foaming includes the following steps: put the parison into the pre-foaming device filled with water, seal, inject carbon dioxide, foam at 50 degrees C. and 12 MPa for 30 minutes, and then foam at 140 degrees C. and 45 MPa for 2.5 hours. The secondary foaming temperature is 110° C., and the secondary foaming time is 1.5 h。The parison is prepared by blending the polymer, the chain extender and the catalyst, and the weight ratio of polymers, chain extender and catalyst is 85:4:1.5, the polymer is HDPE, which is DowDuPont DMDA-6200, the chain extender is 2,5-bis(tert-butylperoxy)-2,5-dimethylhexane, and the catalyst is 2,2'-azodiisobutyronitrile.

Performance Assessment

1. Secondary foaming ratio: The secondary foaming ratio (volume ratio) is calculated, and the results are shown in Table 1.

Figure 2:
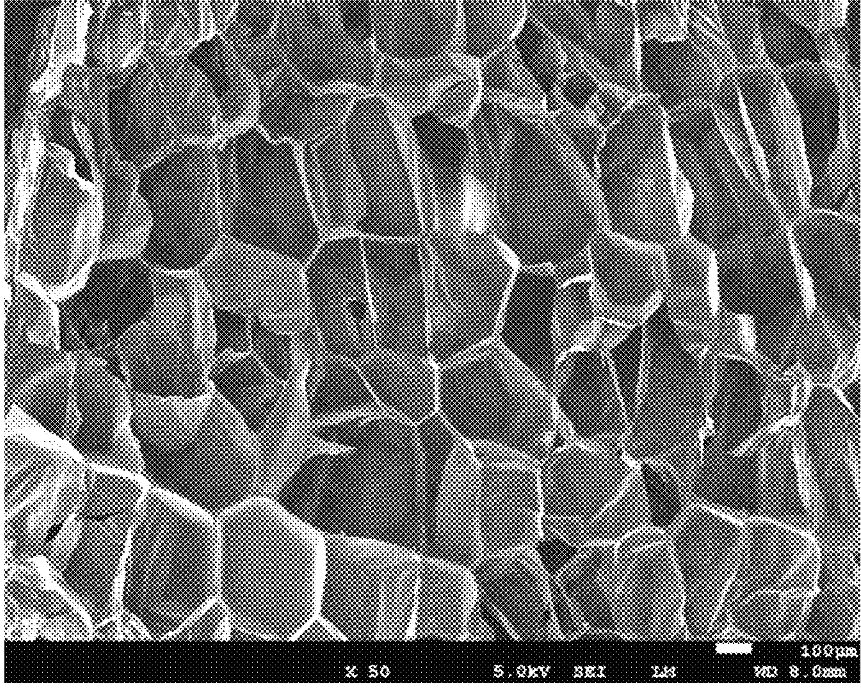
FIG. 2 is the SEM image of the example 2.

2. Uniformity of secondary foaming: The foam uniformity was observed by SEM, and the surface gloss the after secondary foaming was visually observed. The SEM images of examples 1-2 are shown in FIGS. 1-2, indicating the foams are uniform, and the results are shown in Table 1.

TABLE 1

Performance Characterization Test

| Example | Foaming Ratio | Foam Uniformity |
|---|---|---|
| 1 | 11 | The foams are uniform, and the surface is glossy |
| 2 | 12 | The foams are uniform, and the surface is glossy |
| 3 | 8 | The foams are uniform, and the surface is glossy |
| 4 | 8 | The foams are nonuniform |
| 5 | 10 | The foams are nonuniform, and the surface is dark |

It can be seen from the test results that the foaming process provided by the invention can be used for polymer foaming, and has a high foaming rate for high crystalline products, and the prepared product has a smooth and glossy surface and uniform foams.

It is understood that the embodiments described herein should be considered only in the sense described and not for restrictive purposes. The description of features, advantages or aspects in each embodiment shall be deemed applicable to other similar features, advantages or aspects in other embodiments.

What is claimed is:

1. A process for foaming using carbon dioxide solution characterized in:

putting a parison into the carbon dioxide solution for primary foaming, removing and putting the parison into the carbon dioxide solution for secondary foaming to get a foam product.

2. The process of claim 1, wherein the parison is obtained by radiation crosslinking of polymers or crosslinking curing of chain extenders.

3. The process of claim 1, wherein the carbon dioxide solution comprises carbon dioxide and a solvent, and the solvent includes a hydroxyl inorganic substance.

4. The process of claim 3, wherein the solvent also includes inorganic acids.

5. The process of claim 4, wherein the mass percentage of the hydroxyl inorganic substance in the solvent is 0-100 wt %, excluding 0 wt %.

6. The process of claim 4, wherein the solvent also includes one or more of alcohols, esters, ketones, heterocyclic compounds, hydrocarbons and inorganic salts.

7. The process of claim 1, wherein the primary foaming comprising: putting the parison into a pre-foaming device filled with solvent sealing, injecting with carbon dioxide, and foaming at 100-160 degrees C. and 40-50 MPa for 2-3 hours.

8. The process of claim 7, wherein the primary foaming comprising: foaming the parison at 40-60 degrees C. and 10-15 MPa for 20-40 minutes, and then foaming at 100-160 degrees C. and 40-50 MPa for 2-3 hours.

9. The process of claim 1, wherein the secondary foaming is performed at a temperature of 120-130 degrees C.

10. The process of claim 1, wherein the secondary foaming is carried for 1-2 hours.

* * * * *